United States Patent
Kava et al.

(10) Patent No.: US 12,168,434 B2
(45) Date of Patent: *Dec. 17, 2024

(54) HYBRID VEHICLE ENGINE START/STOP SYSTEM

(71) Applicant: FORD GLOBAL TECHNOLOGIES, LLC, Dearborn, MI (US)

(72) Inventors: Christopher Michael Kava, Taylor, MI (US); Kenneth Frederick, Dearborn, MI (US); Floyd Cadwell, Dearborn, MI (US); Justin Reuel Badger, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 828 days.

This patent is subject to a terminal disclaimer.

(21) Appl. No.: 17/089,936

(22) Filed: Nov. 5, 2020

(65) Prior Publication Data

US 2021/0053551 A1  Feb. 25, 2021

Related U.S. Application Data

(62) Division of application No. 15/915,911, filed on Mar. 8, 2018, now Pat. No. 10,857,991.

(51) Int. Cl.
*B60W 20/00* (2016.01)
*B60K 6/42* (2007.10)
(Continued)

(52) U.S. Cl.
CPC ............. *B60W 20/10* (2013.01); *B60K 6/48* (2013.01); *B60W 10/06* (2013.01);
(Continued)

(58) Field of Classification Search
CPC ............. B60W 50/087; B60W 50/085; B60W 50/082; B60W 10/06; B60W 20/40;
(Continued)

(56) References Cited

U.S. PATENT DOCUMENTS 7,766,107 B2  8/2010  Joe et al.
8,659,410 B2  2/2014  Saito
(Continued)

FOREIGN PATENT DOCUMENTS

CN  107031599 A  8/2017
DE  102011084851 A1 *  5/2012  .............. B60L 1/003
(Continued)

OTHER PUBLICATIONS

Shi, D., Chu, L., Guo, J., Tian, G., Feng, Y. and Li, Z., 2017. Energy control strategy of HEB based on the instantaneous optimization algorithm. IEEE Access, 5, pp. 19876-19888.(Year: 2017).*
(Continued)

*Primary Examiner* — Cuong H Nguyen
(74) *Attorney, Agent, or Firm* — David B Kelley; Brooks Kushman P.C.

(57) ABSTRACT

A vehicle includes an engine, an electric machine, and a controller. The engine and the electric machine are configured to simultaneously generate power in a hybrid mode. The controller is programmed to, responsive to a power demand decreasing to less than a first threshold while the vehicle is operating in the hybrid mode, shutdown the engine. The controller is further programmed to, responsive to the power demand decreasing to less than the first threshold and an operator input to extend the hybrid mode, override shutting down the engine.

12 Claims, 2 Drawing Sheets

(51) Int. Cl.
  *B60K 6/48* (2007.10)
  *B60W 10/06* (2006.01)
  *B60W 20/10* (2016.01)
  *B60W 50/08* (2020.01)

(52) U.S. Cl.
  CPC ............ *B60W 50/082* (2013.01); *B60K 6/42* (2013.01); *B60W 2510/06* (2013.01); *B60W 2540/215* (2020.02); *B60Y 2200/92* (2013.01); *Y02T 10/40* (2013.01); *Y10S 903/903* (2013.01)

(58) Field of Classification Search
  CPC ................ B60W 10/08; B60W 20/10; B60W 2540/215; B60W 2510/06; B60W 2540/10; B60W 2550/0054; B60W 2540/103; B60K 6/38; B60K 6/48; B60K 2006/4825; B60K 6/42; B60Y 2200/92; Y02T 10/62; Y02T 10/40; Y10S 903/903
  USPC ........................................................ 701/58
  See application file for complete search history.

(56) References Cited

U.S. PATENT DOCUMENTS

| | | | |
|---|---|---|---|
| 8,972,152 B2 * | 3/2015 | Boesch | F02N 11/0837 701/112 |
| 9,050,970 B2 | 6/2015 | Ueno et al. | |
| 9,090,256 B2 | 7/2015 | Takahashi | |
| 9,162,664 B2 | 10/2015 | Nefcy et al. | |
| 9,205,832 B2 | 12/2015 | Tsutsumi et al. | |
| 9,365,209 B2 | 6/2016 | Yu et al. | |
| 9,533,674 B2 | 1/2017 | Miller et al. | |
| 9,604,635 B1 * | 3/2017 | Johri | B60W 10/06 |
| 9,809,217 B2 * | 11/2017 | Itagaki | B60W 10/02 |
| 9,932,914 B2 | 4/2018 | Mansour et al. | |
| 10,046,757 B2 | 8/2018 | Park | |
| 10,569,763 B2 | 2/2020 | Liu et al. | |
| 10,857,991 B2 * | 12/2020 | Kava | B60W 50/085 |
| 2004/0074682 A1 | 4/2004 | Fussey et al. | |
| 2007/0056783 A1 | 3/2007 | Joe et al. | |
| 2010/0025131 A1 | 2/2010 | Gloceri et al. | |
| 2010/0030456 A1 * | 2/2010 | Chominsky | F02D 41/16 701/112 |
| 2010/0145562 A1 * | 6/2010 | Moran | F02N 11/0837 180/65.28 |
| 2010/0191402 A1 | 7/2010 | Aldrich, III et al. | |
| 2010/0305790 A1 | 12/2010 | Yu et al. | |
| 2012/0072063 A1 | 3/2012 | Kato et al. | |
| 2012/0104768 A1 * | 5/2012 | Gibson | B60L 1/003 290/36 R |
| 2012/0215426 A1 | 8/2012 | Sato et al. | |
| 2012/0323429 A1 | 12/2012 | Bissontz | |
| 2013/0158838 A1 * | 6/2013 | Yorke | B60W 10/115 701/123 |
| 2013/0190953 A1 * | 7/2013 | Niemann | B60L 3/04 180/65.265 |
| 2013/0261911 A1 * | 10/2013 | Zanotti | B60W 30/18018 701/58 |
| 2013/0341934 A1 | 12/2013 | Kawanishi | |
| 2014/0011630 A1 | 1/2014 | Takahashi | |
| 2014/0114512 A1 * | 4/2014 | Treharne | B60W 20/10 180/65.23 |
| 2014/0222270 A1 | 8/2014 | Tsutsumi et al. | |
| 2016/0129777 A1 | 5/2016 | Buffet | |
| 2017/0001628 A1 * | 1/2017 | Itagaki | B60W 20/17 |
| 2017/0080919 A1 | 3/2017 | Follen et al. | |
| 2017/0080923 A1 * | 3/2017 | Johri | B60W 10/06 |
| 2017/0217424 A1 | 8/2017 | Park | |
| 2017/0291598 A1 | 10/2017 | Murase et al. | |
| 2018/0162382 A1 | 6/2018 | Colavincenzo et al. | |
| 2019/0111912 A1 | 4/2019 | Rockwell et al. | |
| 2019/0271275 A1 * | 9/2019 | Pifher | B60K 6/48 |
| 2020/0023726 A1 | 1/2020 | Tsuda et al. | |

FOREIGN PATENT DOCUMENTS

| | | | | |
|---|---|---|---|---|
| DE | 102011085094 A1 * | 5/2012 | ............ | B60H 1/322 |
| DE | 102012219467 A1 * | 5/2013 | ............ | F02N 11/0837 |
| DE | 102013104533 A1 * | 11/2013 | ............ | B60W 10/02 |
| DE | 102014214898 A1 * | 2/2015 | ............ | B60W 10/02 |
| DE | 102016106466 A1 * | 10/2016 | ............ | B60K 6/48 |
| DE | 102017105990 A1 * | 10/2017 | ............ | B60K 6/445 |
| JP | 4466514 B2 * | 5/2010 | ............ | B60K 6/48 |
| JP | 5163811 B2 * | 3/2013 | ............ | B60K 6/445 |
| JP | WO2012057118 | 5/2014 | | |
| JP | 6003915 B2 * | 10/2016 | ............ | B60K 6/48 |

OTHER PUBLICATIONS

Martinez, Clara Marina, Mira Heucke, Fei-Yue Wang, Bo Gao, and Dongpu Cao. "Driving style recognition for intelligent vehicle control and advanced driver assistance: A survey." IEEE Transactions on Intelligent Transportation Systems 19, No. 3 (2017): 666-676.(Year: 2017).*
Rezaei, A., Burl, J.B. and Zhou, B., 2017. Estimation of the ECMS equivalent factor bounds for hybrid electric vehicles. IEEE Transactions on Control Systems Technology, 26(6), pp. 2198-2205 (Year: 2017).*
Denis, N., Dubois, M.R., Trovão, J.P.F. and Desrochers, A., 2017. Power split strategy optimization of a plug-in parallel hybrid electric vehicle. IEEE Transactions on Vehicular Technology, 67(1), pp. 315-326 (Year: 2017).*
Kim, S. J., et al. "Fuel economy assessment of novel multi-mode parallel hybrid electric vehicle." International Journal of Automotive Technology 16 (2015): 501-512. (Year: 2015).*
Yang, Hong, et al. "Development of two-mode hybrid powertrain with enhanced EV capability." SAE International Journal of Engines 4.1 (2011): 1058-1070. (Year: 2011).*
Translated Version of Gibson DE 102011084851 A1 (Year: 2012).*
Translated version of Be et al., DE 102013104533 A1 published on Jul. 11, 2013).*
Wang, Shaohang, and Yiwen Xu. an abstract of "Battery electric vehicle with a fuel cell stack.". (Year: 2019).*
Mousa, A. AI-based Energy Management Strategies for P2 Plug-in Hybrid Electric Vehicles (Doctoral dissertation, MS thesis, AMM, FH OOE),. (Year: 2021).*
Rangarajan, Hariharan. Development and Testing of Control Strategies for the Ohio State University EcoCAR Mobility Challenge Hybrid Vehicle. MS thesis. The Ohio State University,. (Year: 2021).*
Zhong, Qingyun, Huabiao Qin, and Ruoqian Xu. "Study on the Start-Stop System Control Strategy under Different Driving Cycle." 2018 IEEE 14th International Conference on Control and Automation (ICCA). IEEE,. (Year: 2018).*
Coordinated charging of multiple plug-in hybrid electric vehicles in residential distribution grids; Kristien Clement ; Edwin Haesen ; Johan Driesen; 2009 IEEE/PES Power Systems Conference and Exposition; IEEE Conference Paper. (Year: 2009).
A soft start circuit for automobile voltage regulator; Lianshuai Huang ; Jianwei Wang ; Xinghua Fu ; Fang Run; 2011 International Conference on Electronics, Communications and Control (ICECC); IEEE Conference Paper;. (Year: 2011).
Study on the Start-Stop System Control Strategy under Different Driving Cycle; Qingyun Zhong ; Huabiao Qin ; Ruoqian Xu; 2018 IEEE 14th International Conference on Control and Automation (ICCA); IEEE Conference Paper . (Year: 2018).
Brushless DC Hub Motor Drive Control for Electric Vehicle Applications; P Vishnu Sidharthan ; Yashwant Kashyap; 2020 First International Conference on Power, Control and Computing Technologies (ICPC2T); 2020 IEEE Conference Paper.
Influence of hybridisation on eco-driving habits using realistic driving cycles; Daniela Chrenko; IET Intelligent Transport Systems; vol. 9, Issue: 5; IET Journal Article. (Year: 2015).
Real-World Driving Cycle: Case Study Muscat Performance Analysis; Abdullah Al-Janabi ; Nasser Al-Azri ; Omar Abu Mohareb ;

(56) References Cited

OTHER PUBLICATIONS

Michael Grimm ; Hans-Christian Reuss; 2019 2nd International Conference on Smart Grid and Renewable Energy (SGRE); IEEE Conference Paper. (Year: 2019).

* cited by examiner

HYBRID VEHICLE ENGINE START/STOP SYSTEM

REFERENCE TO RELATED APPLICATION

This application is a division of U.S. application Ser. No. 15/915,911 filed Mar. 8, 2018, now U.S. Pat. No. 10,857,991, issued Dec. 8, 2020, the disclosure of which is hereby incorporated in its entirety by reference herein.

TECHNICAL FIELD

The present disclosure relates to hybrid vehicles and control systems for hybrid vehicles.

BACKGROUND

Hybrid vehicles may utilize multiple power sources, including an internal combustion engine and an electric machine, to generate power within a powertrain of the hybrid vehicle.

SUMMARY

A vehicle includes an engine, an electric machine, and a controller. The engine and the electric machine are configured to simultaneously generate power in a hybrid mode. The controller is programmed to, responsive to a power demand decreasing to less than a first threshold while the vehicle is operating in the hybrid mode, shutdown the engine. The controller is further programmed to, responsive to the power demand decreasing to less than the first threshold and an operator input to extend the hybrid mode, override shutting down the engine.

A vehicle includes a powertrain and a controller. The powertrain has an engine and an electric machine. The controller is programmed to, responsive to a power demand decreasing to less than a shutdown threshold while the powertrain is in a hybrid mode, shutdown the engine. The controller is further programmed to, responsive to an operator input to extend the hybrid mode, decrease the shutdown threshold from a base value to an adjusted value for a predetermined period of time.

A vehicle includes an engine, an electric machine, and a controller. The engine and the electric machine are configured to simultaneously generate power in a hybrid mode. The controller is programmed to, responsive to a power demand decreasing to less than an engine shutdown threshold and an operator input to extend a hybrid mode where both the engine and the electric machine are generating power, override shutting down the engine.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
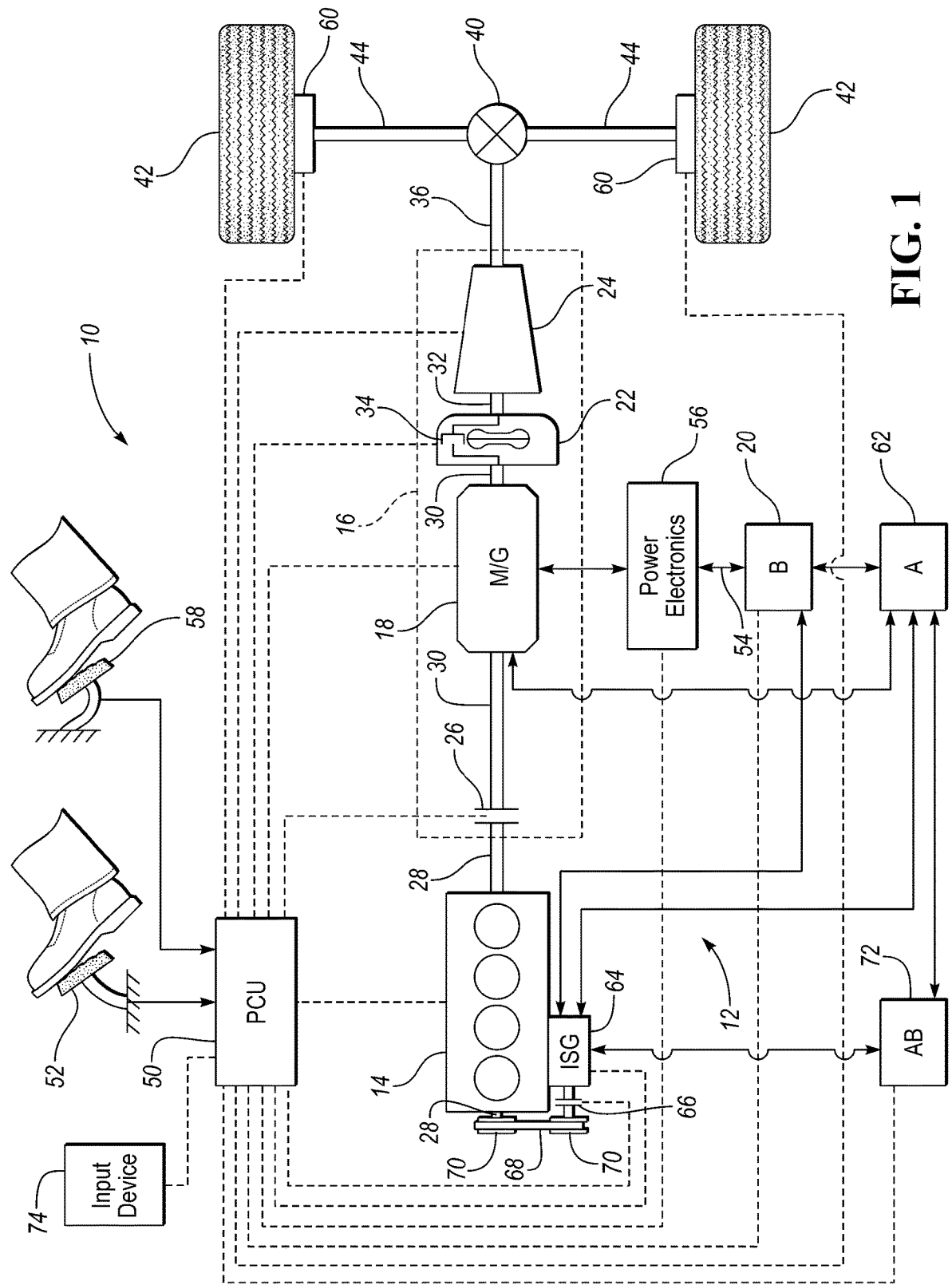
FIG. 1 is a schematic illustration of a representative powertrain of a hybrid electric vehicle.

Referring to FIG. 1, a schematic diagram of a schematic hybrid electric vehicle (HEV) 10 having parallel hybrid powertrain is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). The transmission 16 may be placed in PRNDSL (park, reverse, neutral, drive, sport, low) via transmission range selector. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of drive wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to the powertrain 12 (or more specifically the engine 14 and/or M/G 18) to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque and/or power to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The HEV 10 may also include an input device 74. The input device 74 may be a button on a control panel, a touchscreen of a human machine interface, a paddle shifter located on a steering wheel, or any other device capable of receiving and input from an operator of the HEV 10. The input device 74 may be configured to communicate with the controller 50, which in turn may adjust operating parameters of the various subsystem of the HEV 10 based on the operation of the input device 74.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should be further understood that other hybrid vehicle configurations that include both an EV mode (where an electric machine alone powers the vehicle) and a hybrid mode (where an engine and an electric machine both power the vehicle) should be construed as disclosed herein. Other vehicle configurations may include, but are not limited to, series hybrid vehicles, parallel hybrid vehicles, series-parallel hybrid vehicles, plug-in hybrid electric vehicles (PHEVs), or any other hybrid vehicle configuration known to a person of ordinary skill in the art.

The powertrain energy management software of a hybrid vehicle is responsible for the task of managing engine on and off commands. The main challenge for this software is to provide the most efficient operation of the powertrain in the vehicle. The balance needs to be maintained between providing sufficient engine off operation in the vehicle while keeping the engine on enough to maintain sufficient battery charge level and to provide acceptable vehicle performance that lacks delays, shuffles, and hesitations. Additionally, it is necessary to make sure that the frequency of cycling the engine on and off while driving is not too frequent, which may diminish the efficiency gains of the hybrid vehicle or lead to operator discomfort. For these reasons, the power demand or request thresholds of the hybrid powertrain for starting and stopping the engine are separated by a fairly large threshold. Sometimes, the driver may recognize that the vehicle is near the edge of the threshold but does not desire to change the engine on and off state. Under such scenarios, the driver may change the engine to the "off" state or to the "on" state. For example, the driver may desire to switch the engine "off" in order to achieve an increase in fuel economy. Alternatively, the driver may desire to turn the engine "on" to charge the battery or to provide a quicker vehicle acceleration response for ascending grades, passing another vehicle, etc.

Figure 2:
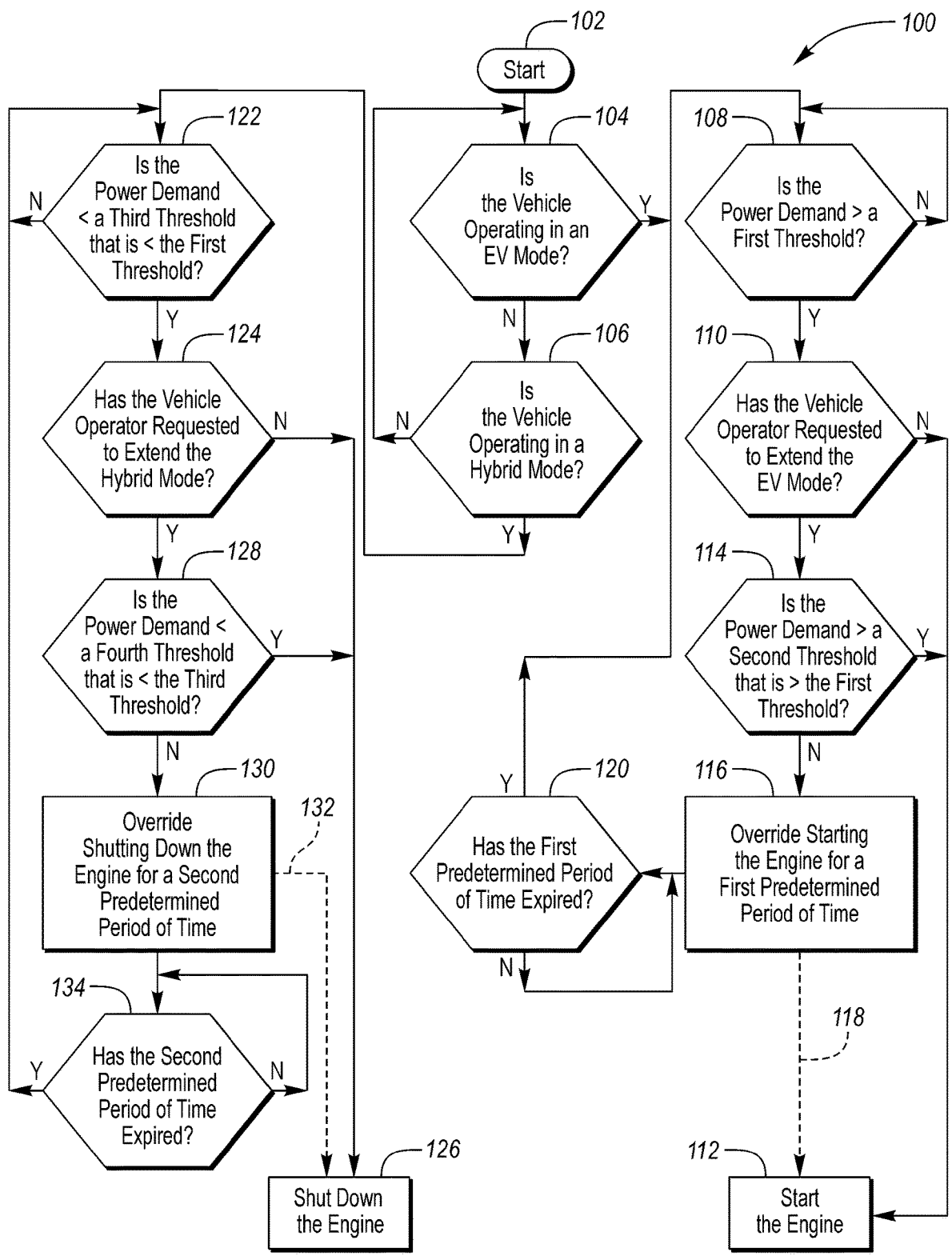
FIG. 2 is a flowchart illustrating a method of controlling a start/stop function of an engine.

Referring to FIG. 2, a flowchart for a method 100 of controlling a start/stop function of an engine is illustrated. The method 100 may be utilized by any type of hybrid vehicle that includes both an engine and an electric machine that are each configured to generate torque and power within the powertrain of the vehicle. For simplification purposes, however, the HEV 10 in FIG. 1 will be referenced while describing the steps of the method 100. The method 100 may be stored as control logic or algorithms in one or more controllers (e.g., controller 50). The one or more controllers may be programmed to implement the method 100 via sending output signals to various components to control the various components based on various conditions or states of the hybrid vehicle (or based on the conditions or states of the various subcomponents or subsystems of the hybrid vehicle) received by the one or more controllers via input signals.

The method 100 begins at start block 102. The method 100 may be initiated once an ignition of the HEV 10 is turned to an "on" position. Next, the method 100 moves on to block 104 where it is determined if the HEV 10 (or more specifically the powertrain 12) is operating in an EV mode where the engine 14 is shutdown and the M/G 18 is generating power within the powertrain 12 alone. If it is determined that the HEV 10 (or more specifically the powertrain 12) is not operating in the EV mode at block 104, the method 100 moves on to block 106 where it is determined if the HEV 10 is operating in a hybrid mode where both the engine 14 and the M/G 18 are generating power within the powertrain 12. If it is determined that the HEV 10 is not operating in the hybrid mode at block 106, the method 100 recycles back to the beginning of block 104.

Returning to block 104, if it is determined that the HEV 10 is operating in the EV mode, the method 100 moves on to block 108 where it is determined if a power demand or request to the powertrain 12 (or more specifically to the engine 14 and/or the M/G 18) is greater than a first threshold. Alternatively stated, the first threshold may be a base value of a startup threshold for the engine 14. If it is determined that the power demand is not greater than the first threshold at block 108, the method 100 recycles back to the beginning of block 108. If it is determined that the power demand is greater than the first threshold at block 108, the method 100 moves on to block 110 where it is determined if a vehicle operator has requested to extend the EV mode or to suppress a startup of the engine 14. The vehicle operator may input a request to extend the EV mode or to suppress the startup of the engine 14 by communicating such a request to the controller 50 by an interfacing device, such as input device 74. If it is determined that the vehicle operator has not requested to extend the EV mode or to suppress a startup of the engine 14 at block 110, the method 100 moves on to block 112 where the engine 14 is commanded to start. If it is determined that the vehicle operator has requested to extend the EV mode or to suppress a startup of the engine 14 at block 110, the method 100 moves on to block 114.

At block 114 it is determined if the power demand or request to the powertrain 12 (or more specifically to the engine 14 and/or the M/G 18) is greater than a second threshold that is greater than the first threshold. Alternatively stated, the second threshold may be an adjusted or increased value (relative to the base value) of the startup threshold for the engine 14, that is the result of the operator requesting to extend the EV mode or to suppress a startup of the engine 14 at block 110. If it is determined that the power demand is greater than the second threshold at block 114, the method 100 moves on to block 112 where the engine 14 is commanded to start. If it is determined that the power demand is not greater than the second threshold at block 114, the method 100 moves on to block 116 where the method 100 overrides or suppresses starting the engine 14 for a first predetermined period of time. The first predetermined period of time may be a set period of time that is stored as control logic in the form of a timer within the controller 50.

The "countdown" of the timer may be initiated in response to the "no" condition of block 114.

During the first predetermined period of time initiated at block 116, block 114 may still monitor whether the power demand or request to the powertrain 12 is greater than the second threshold. If the power demand or request to the powertrain 12 exceeds the second threshold at any moment during the first predetermined period of time initiated at block 116, the method 100 may cancel overriding or suppressing starting the engine 14 and move on to block 112 in order to start the engine 14 as indicated by broken arrow 118. Once the first predetermined period of time is initiated at block 116, the method 100 determines whether or not the first predetermined period of time has expired at block 120. If it is determined at block 120 that the first predetermined period of time initiated block 116 has not expired, the method 100 recycles back to the beginning of block 120. If it is determined at block 120 that the first predetermined period of time initiated at block 116 has expired, the method 100 recycles back to the beginning of block 108.

Returning to block 106, if it is determined that the HEV 10 is operating in the hybrid mode, the method 100 moves on to block 122 where it is determined if the power demand or request to the powertrain 12 (or more specifically to the engine 14 and/or the M/G 18) is less than a third threshold that is less than the first threshold. Alternatively stated, the third threshold may be a base value of a shutdown threshold for the engine 14. If it is determined that the power demand is not less than the third threshold at block 122, the method 100 recycles back to the beginning of block 122. If it is determined that the power demand is less than the third threshold at block 122, the method 100 moves on to block 124 where it is determined if a vehicle operator has requested to extend the hybrid mode or to suppress a shutdown of the engine 14. The vehicle operator may input a request to extend the hybrid mode or to suppress the shutdown of the engine 14 by communicating such a request to the controller 50 by an interfacing device, such as input device 74. If it is determined that the vehicle operator has not requested to extend the hybrid mode or to suppress a shutdown of the engine 14 at block 124, the method 100 moves on to block 126 where the engine 14 is commanded to shutdown. If it is determined that the vehicle operator has requested to extend the hybrid mode or to suppress a shutdown of the engine 14 at block 124, the method 100 moves on to block 128.

At block 128 it is determined if the power demand or request to the powertrain 12 (or more specifically to the engine 14 and/or the M/G 18) is less than a fourth threshold that is less than the third threshold. Alternatively stated, the fourth threshold may be an adjusted or decreased value (relative to the base value) of the shutdown threshold for the engine 14, that is the result of the operator requesting to extend the hybrid mode or to suppress a shutdown of the engine 14 at block 124. If it is determined that the power demand is less than the fourth threshold at block 128, the method 100 moves on to block 126 where the engine 14 is commanded to shutdown. If it is determined that the power demand is not less than the fourth threshold at block 128, the method 100 moves on to block 130 where the method 100 overrides or suppresses shutting down the engine 14 for a second predetermined period of time. The second predetermined period of time may be a set period of time that is stored as control logic in the form of a timer within the controller 50. The "countdown" of the timer may be initiated in response to the "no" condition of block 128.

During the second predetermined period of time initiated at block 130, block 128 may still monitor whether the power demand or request to the powertrain 12 is less than the fourth threshold. If the power demand or request to the powertrain 12 drops below the fourth threshold at any moment during the second predetermined period of time initiated at block 130, the method 100 may cancel overriding or suppressing shutting down the engine 14 and move on to block 126 in order to shutdown the engine 14 as indicated by broken arrow 132. Once the second predetermined period of time is initiated at block 130, the method 100 determines whether or not the second predetermined period of time has expired at block 134. If it is determined at block 134 that the second predetermined period of time initiated block 130 has not expired, the method 100 recycles back to the beginning of block 134. If it is determined at block 134 that the second predetermined period of time initiated at block 134 has expired, the method 100 recycles back to the beginning of block 122.

The difference between the first threshold (e.g., startup threshold) and the third threshold (e.g., shutdown threshold) may be referred to as a "hysteresis zone" that is designed to prevent an immediate startup after a shutdown or an immediate shutdown after a startup. The "hysteresis zone" may remain relatively constant. Therefore, under a scenario where the startup threshold has been temporarily increased, the shutdown threshold will also temporarily increase by approximately the same amount. Also, under a scenario where the shutdown threshold has temporarily decreased, the startup threshold will also temporarily decrease by approximately the same amount.

It should be understood that the flowchart in FIG. 2 is for illustrative purposes only and that the method 100 should not be construed as limited to the flowchart in FIG. 2. Some of the steps of the method 100 may be rearranged while others may be omitted entirely. It should be further understood that the designations of first, second, third, fourth, etc. for thresholds, time periods, or any other factor relevant to the method 100 in FIG. 2 may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine and an electric machine configured to simultaneously generate power in a hybrid mode; and
   a controller programmed to,
   responsive to a power demand decreasing to less than a first threshold while the vehicle is operating in the hybrid mode, shutdown the engine, and responsive to the power demand decreasing to less than the first threshold and an operator input to extend the hybrid mode, override shutting down the engine.

2. The vehicle of claim 1, wherein the controller is further programmed to, responsive to the power demand decreasing to less than a second threshold that is less than the first threshold and the operator input to extend the hybrid mode, cancel overriding shutting down the engine and shutdown the engine.

3. The vehicle of claim 2, wherein the controller is further programmed to, responsive to the power demand decreasing to less than the first threshold but not the second threshold after the expiration of a predetermined period of time, shutdown the engine.

4. The vehicle of claim 2, wherein the controller is further programmed to, responsive to the power demand exceeding a third threshold that is greater than the first threshold while the electric machine is generating power alone in an electric only mode, start the engine.

5. The vehicle of claim 4, wherein the controller is further programmed to, responsive to the power demand exceeding the third threshold and an operator input to increase the electric only mode, override starting the engine for a predetermined period of time.

6. A vehicle comprising:
an engine and an electric machine configured to simultaneously generate power in a hybrid mode; and
a controller programmed to, responsive to a power demand decreasing to less than an engine shutdown threshold and an operator input to extend a hybrid mode where both the engine and the electric machine are generating power, override shutting down the engine.

7. The vehicle of claim 6, wherein the controller is further programmed to, responsive to the power demand decreasing to less than the engine shutdown threshold while the vehicle is operating in the hybrid mode and absence of the operator input to extend the hybrid mode, shutdown the engine.

8. The vehicle of claim 6, wherein the controller is further programmed to, responsive to the power demand decreasing to less than a second engine shutdown threshold that is less than the engine shutdown threshold and the operator input to extend the hybrid mode, cancel overriding shutting down the engine and shutdown the engine.

9. The vehicle of claim 8, wherein the controller is further programmed to, responsive to the power demand decreasing to less than the engine shutdown threshold but not the second engine shutdown threshold after the expiration of a predetermined period of time, shutdown the engine.

10. The vehicle of claim 6, wherein the controller is further programmed to, responsive to the power demand exceeding an engine startup threshold that is greater than the engine shutdown threshold while the electric machine is generating power alone in an electric only mode, start the engine.

11. The vehicle of claim 10, wherein the controller is further programmed to, responsive to the power demand exceeding the engine startup threshold and an operator input to increase the electric only mode, override starting the engine for a predetermined period of time.

12. The vehicle of claim 11, wherein the controller is further programmed to, responsive to the power demand exceeding the engine startup threshold after the expiration of a predetermined period of time, start the engine.

* * * * *